Jan. 26, 1954   F. B. CARNEY   2,667,112
LIFT FRAME FOR AGRICULTURAL IMPLEMENTS
Filed July 14, 1949
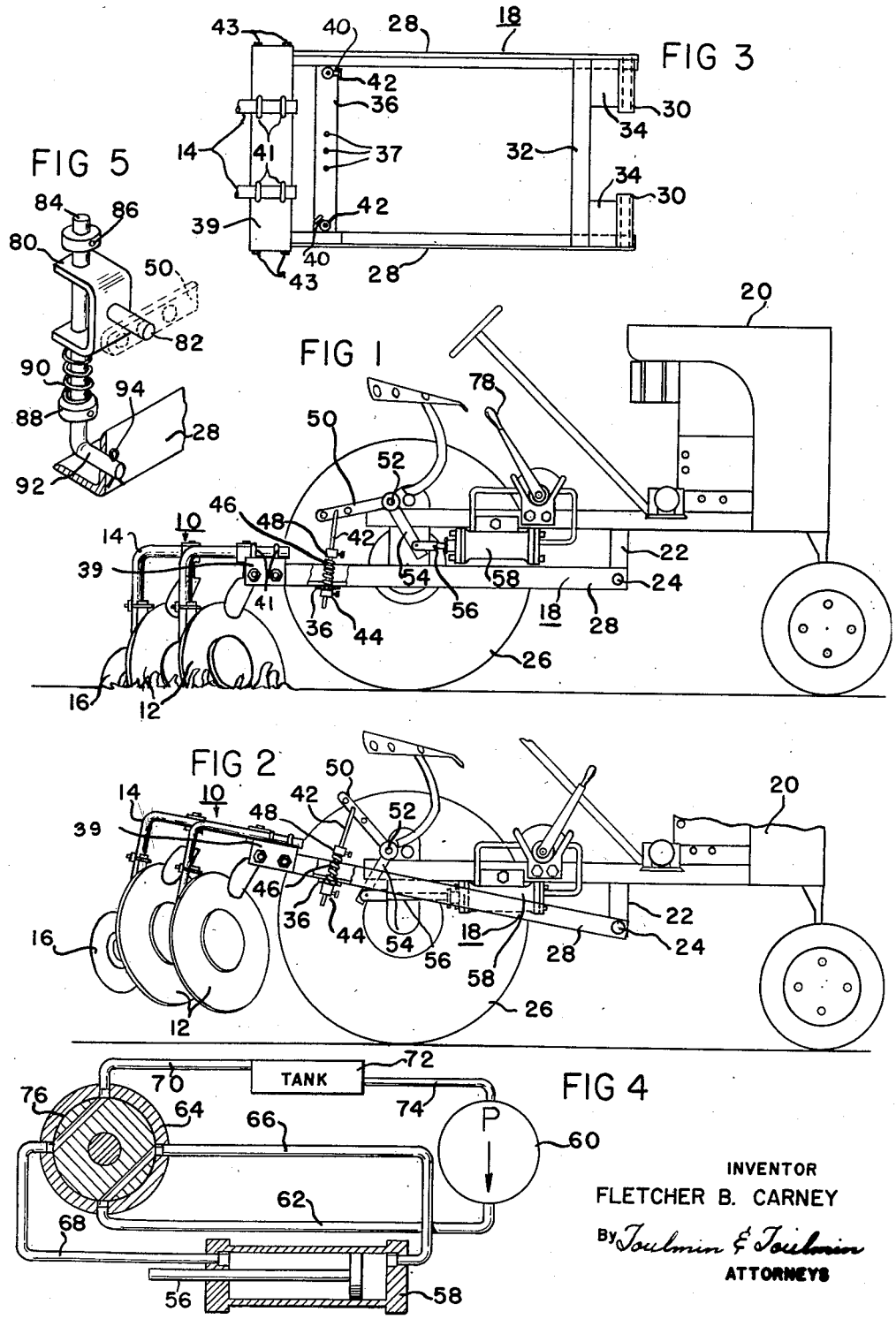
INVENTOR
FLETCHER B. CARNEY
By Toulmin & Toulmin
ATTORNEYS Patented Jan. 26, 1954

2,667,112

UNITED STATES PATENT OFFICE 2,667,112

LIFT FRAME FOR AGRICULTURAL IMPLEMENTS

Fletcher B. Carney, Mountain Brook, Ala.

Application July 14, 1949, Serial No. 104,649

1 Claim. (Cl. 97—47.63)

This invention relates to agricultural machinery, and particularly to an improved type lift frame adapted for connecting implements to tractors.

Many farm implements at the present time are adapted for connection with tractors to be drawn and conveyed thereby. A number of different types of arrangements have been devised for connecting implements of various types to tractors so they can be held down against the ground by the tractor or elevated from the ground for transport by the tractor when the implement is not working. Most arrangements of this nature take the form of links and pivoted arms connected to the back end of the tractor and then directly connected with the implement that is to be drawn by the tractor.

The instant invention is concerned with an improved type frame for connecting an implement with a tractor such that the connection of the frame with the tractor is well forward of the rear wheels of the tractor, so that the usual complicated attaching mechanism is substantially entirely eliminated.

Another object of this invention is to provide an adapter frame for connecting trailing farm implements to a tractor, such that the implement can readily be placed against the ground or lifted therefrom.

Still another object is the provision of an adapter frame for connecting an implement to a tractor such that the implement can be attached to the tractor or taken therefrom with a minimum of trouble.

A particular object of this invention is to provide an adapter frame for connecting an implement such as a disk plow to a tractor, such that the angularity with which the discs of the plow engage the ground is substantially unchanged by small changes in the working depth thereof.

A still further object is the provision of a frame for securing a ground working farm implement such as a disc plow to a tractor frame in such a manner that the usual links, levers, and arms associated with tractor lifts are eliminated, and the draft which is transmitted to the implement is carried by tension members extending substantially in the direction of the said draft.

Another object is the provision of an adapter frame of the type referred to above which is inexpensive and simple to construct, and which affords a maximum of strength for a minimum amount of weight.

These and other objects and advantages will become more apparent upon reference to the following description taken in connection with the accompanying drawings in which:

Figure 1 is a side elevational view showing a tractor having a disc plow mounted thereon by an adapter frame according to this invention and with the said plow in working position;

Figure 2 is a similar view but with the plow elevated for transport;

Figure 3 is a plan view looking down on the adapter frame itself;

Figure 4 is a view showing diagrammatically one type of hydraulic operating circuit adapted for use in connection with a frame according to this invention; and Figure 5 is a perspective view showing a modified arrangement for connecting the adapter frame to the lift arms of the tractor lift.

Referring to the drawings somewhat more in detail, it will be seen that in Figures 1 and 2 there is a disc plow mechanism, generally indicated at 10, and which is substantially the same as that shown in my co-pending application, Serial Number 49,897, filed September 18, 1948.

Briefly, the disc plow comprises a pair of plowing discs 12 supported on beam members 14 that extend forwardly for connection with a source of motive power. The plow also includes a coulter wheel 16 that regulates the depth that plowing discs 12 extend into the ground and which also absorb side thrusts on the plow, so that it does not drift when working. The discs are adjustable on beams 14 by virtue of their connection thereto as at 15 in a manner fully disclosed in the above identified applications, so the discs can be presented to the ground in any of a plurality of different angles.

The forward ends of beams 14 are connected with a frame 18 that extends forwardly and beneath tractor 20 and has a pivotal connection with the frame of the tractor, as by means of the depending brackets 22 and the pivot shaft 24. It will be seen that the frame 18 extends to a substantial distance forwardly of rear wheel 26 of the tractor, and this is of importance in insuring that the frame 18 will be substantially entirely in tension during working of the disc plow. This enables the frame to be made of relatively light members but still to have adequate strength for all uses to which it is put. It is pointed out that the tractor 20 is of the type having the conventional drop axle arrangement as indicated schematically in Figures 1 and 2. With this arrangement there will be no interference with the supporting frame 18 by the drive axle of the tractor when the frame 18 is in the position indicated in Figure 2.

The frame 18 is shown in plan in Figure 3 and it will be seen to comprise a pair of laterally spaced longitudinally extending beams or angle members 28 having secured thereto at their forward or right ends, as viewed in Figure 3, the tubular elements 30 that define a transverse pivot axis. This pivot axis is that which receives pivot shaft 24 for supporting frame 18 on bracket 22.

Immediately rearwardly of tubular elements 30 there is a transversely extending bar 32 that is rigidly secured to each of angle members 28, as by welding. Reinforcing gusset plates 34 are placed between bar 32 and each of elements 30 and are secured to the said bar and elements and angle members 28, as by welding, in order to make a rigid construction.

Adjacent their opposite ends, the angle members 28 are interconnected by another transverse bar 36 that is also made rigid with the said angle members by welding or other suitable means. The transverse bar 36 and the rear, or left-hand ends of angle member 28 as viewed in Figure 3, are apertured as at 37 so implements can be secured thereto. As illustrated in the drawings, the beams 14 are rigidly connected with bracket 39, as by U-bolts 41, while the said bracket extends over the side members 28 and is bolted thereto by the bolts 43.

Transverse bar 36 is slotted, as at 40, and through these slots there extend the lift rods 42. Rods 42 have collars 44 thereon immediately beneath bar 36, while above bar 36, the compression springs 46 encircle the rods. Above springs 46 are other collars 48, and this arrangement provides for positive lifting of frame 18 and plow 10 when rods 42 are moved upwardly, and for resiliently urging the plow against the ground when rods 42 are urged downwardly.

The upper ends of rods 42 are pivotally connected with arms 50 that extend outwardly from a transverse shaft 52 mounted adjacent the rear end of the tractor. Another arm 54 is connected with shaft 54 and is, in turn, operatively connected with a double acting ram 56 extending into hydraulic cylinder 58.

Cylinder 58, as will be seen in Figure 4, is adapted for being reversibly supplied with pressure fluid from pump 60 which discharges through conduit 62 to the inlet of a reversing valve 64 that has service lines 66 and 68 connected with opposite ends of cylinder 58, and an exhaust line 70 connected with a tank 72 which is also connected with the suction side of the pump by conduit 74.

It will be apparent that actuation of the movable member 76 of valve 64 as by lever 78 adjacent the driver's position of the tractor, will selectively drive ram 56 in one direction or the other in cylinder 58, or close off fluid communication between cylinder 58 and pump 60 and tank 72 thereby to hold ram 56 in a predetermined position.

It is to be noted that frame 18 is of such a length that the changes in angularity of the implement relative to the ground as its working depth in the ground is adjusted are relatively minute, and that, accordingly, it is possible to present the implement to any desired angle to the ground and to maintain that angularity throughout all working depths of the implement. This is particularly beneficial in connection with a disc type plow, because by properly adjusting the discs on their beams, the plow can be made self-energizing so that it will automatically dig into the ground to the proper depth and throw the earth out from the furrow which the plow makes.

Adjustable discs for disc plows are shown and described in my co-pending applications referred to above, and it will be evident that the attaching frame arrangement which I have disclosed in the instant application is of particular benefit in connection with a disc plow of this nature. It will also be evident that the frame has utility in connection with other types of implements, and that harrows, pulverizers, seeders, listers, and many other types of farm implements can be advantageously employed in connection with my lift frame.

In Figure 5 there is shown an arrangement adapted for replacing the lift link 42. In this view the U-shaped brackets 80 have pivot posts 82 for connection with the lift arms 50. The legs of the bracket are apertured to receive rod 84 which has set collar 86 above the bracket and set collar 88 beneath the bracket, the latter being spaced downwardly from the bracket to accommodate compression spring 90. The lower end of rod 84 is bent out as at 92 and extends through an aperture in side member 28 to be retained therein by a set collar, or by a cotter pin, as shown at 94. The arrangement of Figure 5 is simple, effective, and inexpensive, and eliminates the need for weakening slots in bar 36.

It will be understood that this invention is susceptible to modification in order to adapt it to different usages and conditions, and, accordingly, it is desired to comprehend such modifications within this invention as may fall within the scope of the appended claim.

I claim:

In combination, a tractor of the type having a raised rear axle, depending brackets from the middle region of the frame of said tractor, a pivot shaft mounted between said brackets, the ends of said shaft projecting beyond said brackets, a rectangular implement supporting frame extending beneath said tractor having one end pivotally mounted on said pivot shaft and the other end projecting beyond the end of said tractor, said supporting frame comprising a pair of laterally spaced longitudinally extending beams, a tubular element affixed to the front end of each beam and extending inwardly therefrom, said elements defining a single transverse pivot axis and receiving the projecting ends of said pivot shaft, a first transverse bar extending between and rigidly fastened to said beams immediately rearwardly of said elements, reinforcing gusset plates secured to said transverse bar, beams, and tubular elements, a second transverse bar extending between and rigidly secured to said beams adjacent the rear ends thereof, said second transverse bar having slots adjacent each end thereof, a transverse bracket member interconnecting the ends of said beams, lifting mechanism for said frame comprising a transverse shaft mounted on the rear of the frame of said tractor, double acting hydraulic lift means, a bellcrank lever pivotally mounted on said transverse shaft and one end connected to said lift means whereby said lever is actuated by said lift means, lift rods extending from the other end of said bellcrank through said slots in said second transverse bar, collars affixed to said lift rods immediately beneath said second transverse bar, compression springs on said lift rods immediately above said second transverse bar, collars affixed on said lift rods immediately above said springs, a trailing implement on said tractor having forwardly extending draft portions, said potrions being connected to said transverse bracket on said frame whereby said trailing implement is coplanar with said frame, said frame being substantially horizontal when said implement is in working position.

FLETCHER B. CARNEY.

References Cited in the file of this patent

UNITED STATES PATENTS

| Number | Name | Date |
|---|---|---|
| 1,072,119 | Hill | Sept. 2, 1913 |
| 1,360,801 | Runyans | Nov. 30, 1920 |
| 1,746,606 | Ray | Feb. 11, 1930 |
| 1,808,759 | Bickerton | June 9, 1931 |
| 1,929,804 | Brown | Oct. 10, 1933 |
| 2,015,823 | Thomas | Oct. 1, 1935 |
| 2,298,540 | Mott | Oct. 13, 1942 |
| 2,324,840 | Hipple | July 20, 1943 |
| 2,337,764 | Mott | Dec. 28, 1943 |
| 2,403,360 | Graham | July 2, 1946 |
| 2,505,580 | Todd | Apr. 25, 1950 |
| 2,546,461 | Lewis | Mar. 27, 1951 |
| 2,593,176 | Patterson | Apr. 15, 1952 |